(12) United States Patent
Bozorgui-Nesbat

(10) Patent No.: US 6,847,706 B2
(45) Date of Patent: Jan. 25, 2005

(54) METHOD AND APPARATUS FOR ALPHANUMERIC DATA ENTRY USING A KEYPAD

(76) Inventor: Saied Bozorgui-Nesbat, 2708 Monserat Ave., Belmont, CA (US) 94002

( * ) Notice: Subject to any disclaimer, the term of this patent is extended or adjusted under 35 U.S.C. 154(b) by 84 days.

(21) Appl. No.: 10/006,356

(22) Filed: Dec. 10, 2001

(65) Prior Publication Data

US 2002/0136372 A1 Sep. 26, 2002

Related U.S. Application Data

(63) Continuation-in-part of application No. 09/811,558, filed on Mar. 20, 2001, now abandoned.

(51) Int. Cl.[7] .............................................. H04M 11/00
(52) U.S. Cl. ................. 379/93.27; 379/93.18; 345/172
(58) Field of Search ........................... 379/90.01, 93.18, 379/93.19, 93.27, 355.06, 353, 368–369; 345/168, 171–173, 811; 341/22, 28; 400/109–109.1, 484–486; 710/67

(56) References Cited

U.S. PATENT DOCUMENTS

| | | | |
|---|---|---|---|
| 3,967,273 A | | 6/1976 | Knowlton |
| 4,008,793 A | * | 2/1977 | Terracina ................. 400/109.1 |
| 4,427,848 A | | 1/1984 | Tsakanikas |
| 5,339,358 A | * | 8/1994 | Danish et al. .............. 379/368 |
| 5,818,437 A | * | 10/1998 | Grover et al. .............. 345/811 |
| 6,231,252 B1 | * | 5/2001 | Kitamura .................... 400/484 |
| 6,518,957 B1 | * | 2/2003 | Lehtinen et al. ............ 345/173 |

* cited by examiner

*Primary Examiner*—George Eng
(74) *Attorney, Agent, or Firm*—Venable LLP; Robert Babayi

(57) ABSTRACT

A keypad for entering letters includes an array of keys with each key being assigned to at least one letter of an alphabetical system based on the frequency of occurrence of the least one letter in a typical body of written work. The alphabetical system comprises at least one most-frequently-occurring letter that is entered by activation of the same key twice and at least one less-frequently-occurring letter that is entered by activation of two different keys.

21 Claims, 8 Drawing Sheets

| ENGLISH LETTER FREQUENCIES ||  |
|---|---|---|
| LETTER | % | CUM % |
| E | 13.0 | 13.0 |
| T | 9.3 | 22.3 |
| N | 7.8 | 30.1 |
| R | 7.7 | 37.8 |
| I | 7.4 | 45.2 |
| O | 7.4 | 52.6 |
| A | 7.3 | 59.9 |
| S | 6.3 | 66.2 |
| D | 4.4 | 70.6 |
| H | 3.5 | 74.1 |
| L | 3.5 | 77.6 |
| C | 3.0 | 80.6 |
| F | 2.8 | 83.4 |
| P | 2.7 | 86.1 |
| U | 2.7 | 88.8 |
| M | 2.5 | 91.3 |
| Y | 1.9 | 93.2 |
| G | 1.6 | 94.8 |
| W | 1.6 | 96.4 |
| V | 1.3 | 97.7 |
| B | 0.9 | 98.6 |
| X | 0.5 | 99.1 |
| K | 0.3 | 99.4 |
| Q | 0.3 | 99.7 |
| J | 0.2 | 99.9 |
| Z | 0.1 | 100.0 |

FIG. 2

METHOD AND APPARATUS FOR ALPHANUMERIC DATA ENTRY USING A KEYPAD

This is a continuation-in-part of Application Ser. No. 09/811,558, filed Mar. 20, 2001, now abandoned.

FIELD OF THE INVENTION

The present invention relates in general to the field of data entry, and more specifically to a keypad for entering alphanumerical data.

BACKGROUND

With the proliferation of computing devices around the world and their mainstream use for accessing the Internet, various alphanumerical data or text entry methods have been developed. Usually, alphanumeric data is entered via a keyboard or keypad device that includes keys for entering the letters of an alphabetical system. Keyboards are in use today that support the alphabetical system and letters of many languages, for example, English, French, Arabic, Japanese, Chinese, etc. For entering English letters, most keyboards use a well known "QWERTY" layout for positioning letters on the keys. The "QWERTY" layout was developed in the early days of mechanical typewriters, mainly to minimize mechanical jamming instances associated with typing English letters.

With the increased mobility of the users, the size of the computing devices has been decreasing steadily. Space limitation imposed by such decrease in size has created a challenge to design practical keypads that would fit on a small computing device, for example, a laptop or a PDA. Some small devices incorporate a full, but miniaturized QWERTY keypad to provide users with a familiar text entry system. Some of the miniaturized keypads, however, are so small that they must be used with the tip of one finger or even the sharp tip of a pen-like device.

Because limited keypad space on many small devices makes the use of a full keypad prohibitive or difficult, alternative text entry methods have been devised. For example, some PDA's like 3Com's Palm Pilot provide a handwriting-recognition system. With some training, users can input letters through defined pen strokes. However, entering letters using this system requires the use of both hands, which is unsuitable under some conditions, for example, while driving.

Today, many wireless devices (such as, cellular telephones) are also used for Internet browsing and instant messaging. Most wireless devices do not use a "QWERTY" keyboard or hand-writing recognition system. In general, the input system for such devices is based on a 12-key layout, with some having additional keys for special functions. As shown in FIG. 1, a conventional keypad consists of number keys 0–9 and two additional keys (# and *). Based on a rudimentary grouping, letters A–Z are spread over keys 2–9 in alphabetical order, where either three or four letters are assigned to a key.

Another class of solutions is based on virtual or soft-keyboards, where the size and positions of the keys can be arbitrarily defined to increase efficiency. With the popularity of Palm Pilots and the emergence of tablet and wearable computers this strategy has become of particular interest. Using virtual keyboards different keyboard configurations can be used to suit the task at hand or the language to be used.

The most commonly used text entry method for the 12-key layout is described in U.S. Pat. Nos. 5,392,338 and 4,658,417. The method is a multi-press method that requires activating a particular number-key once or several times until a desired letter is displayed. The method requires locating a desired letter, which is grouped among two or three other letters, on a corresponding number key. Once the corresponding number key is located, the user then activates the located key a number of times according to the position of that letter in the group of alphabets on the key. However, for sequential entry of two consecutive letters on the same key (for example, letters h and I, which are on key-4) the user, after entering a first letter on a key, must pause for a predefined time period (typically, two seconds) to enter a subsequent letter on the same key. The pause would allow the system to recognize the sequential entry of two letters on the same key. For example, to type the word "this" using the above described multi-press method, the user must activate the following sequence of keys:

Activate key ($8_{TUV}$) once to enter letter t;

Activate key ($4_{GHI}$) twice to enter letter h;

Pause for 2 seconds: since the next letter is on the same key;

Activate key ($4_{GHI}$) three times to enter letter i;

Activate key ($7_{PQRS}$) four times to enter letter s.

It would be appreciated that the forced pause associated with entering letters that use the same key makes the data entry process slow, while interrupting the flow of user's input. To remedy this problem, some systems offer a time-out kill feature that allows the user to activate a stop-wait key (typically # key) to select the current choice and to allow the user to proceed with the next letter entry immediately. Although this feature eliminates the forced pause, it instead adds to the number of key entries.

Another conventional method for entering alphanumeric data using a 12-key layout is a two-key method, which is described in U.S. Pat. No. 4,650,927. To enter a particular letter under the two-key method, the user first activates the key where the letter is located, and then activates the number key indicating the position of the letter on that key. For example, to enter letter K, first key ($5_{JKL}$) is pushed (since K is located on the numeric key 5) then key ($2_{ABC}$) is pushed (since the K is the $2^{nd}$ letter on the group JKL). To type the word "this" using the multi-press method, one must enter the following sequence of keys:

Activate key ($8_{TUV}$) once, then activate key (1) once to enter letter t;

Activate key ($4_{GHI}$) once, then activate key ($2_{ABC}$) once to enter letter h;

Activate key ($4_{GHI}$) once, then activate key ($3_{DEF}$) once to enter letter i;

Activate key ($7_{PQRS}$) once, then activate key ($4_{GHI}$) once to enter letter s.

Although this method does not suffer from the pause requirement of the multi-press method, in practice it has proved less popular, perhaps because it requires more user attentiveness, or because it forces the users to activate different keys more frequently.

Several other text entry systems using the 12-key layout have been proposed in the past. One early text entry method that uses a 12-key layout is described in U.S. Pat. No. 3,967,273. Although not widely used, the described method requires an array of keys with each key being labeled with at most a three by three array of letters. Text is entered by activating a first key on which a desired letter is located, and activating a second key as indicated by a position element of the desired letter on a position array disposed on the first key. This method maps the QWERTY letter pattern of the typewriter to the 12- or 16-key layout of a telephone for insuring those familiar with the location of letters and numbers on a typewriter can quickly find the letters on the keypad. There has been other alphanumeric data entry systems, proposed but rarely used, that relay on activating two keys to enter letters and special symbols. For example, U.S. Pat. Nos. 5,117,455 and 5,339,358 describe an arrangement for placing each letter or symbol between two keys. The sequence of activating the keys indicates the entry of that letter or symbol.

Other keypad input methods are described in U.S. Pat. Nos. 6,011,554, 5,664,896, and 4,650,927. Generally, these methods fall under a relatively new text entry technique known as the T9 technique. The T9 technique requires only one key activation per letter, and relies on a built-in linguistic model to disambiguate input on a word-by-word basis. One such method employs a disambiguation software that uses a dictionary and attempts to predict or "guess" the most probable word entry. This dictionary-based disambiguation relies on user attentiveness, since from time to time the user has to intervene and guide the software to select a less frequently used word, for example, abbreviation, jargon, foreign or otherwise words that are not in the dictionary. A similar method is described by Hedy Kober, Eugene Skepner, Terry Jones, Howard Gutowitz, and Scott MacKenzie, *Linguistically Optimized Text Entry on a Cell Phone* Submitted to CHI 2001. This method uses the probability of next letter occurrence as a guide to disambiguate and guess the letter to be input next.

Studies have been performed to assess the user entry speed for some of the above described methods. One study for predicting a potential expert user text entry speed is authored by Silfverberg, M., MacKenzie, I. S., & Korhonen, P, in *Predicting text entry speeds on mobile phones*, Proceedings of the ACM Conference on Human Factors in Computing Systems—*CHI* 2000, pp. 9–16. New York: ACM (2000). The study predicts text entry speed into the 12-key layout for one-handed thumb and two-handed index finger entry. According to the study, the traditional multi-press method can support text entry rates of up to about 25 wpm or 27 wpm for one-handed thumb input or two-handed index finger input, respectively, provided the user effectively employs the timeout kill feature for consecutive letters on the same key. If the timeout kill feature is not used to distinguish consecutive letters on the same key, then the entry rates is found to be decreased by about 4 wpm in each case. The two-key input technique is found to be slightly slower than the multi-press method (using timeout kill): 22 wpm and 25 wpm for one-handed thumb input and two-handed index finger input, respectively. Under the T9 technique, text entry rates of 41 wpm and 46 wpm are predicted for one-handed thumb input and two-handed index finger input, respectively. This study assumes expert behavior and a "perfect" disambiguation algorithm.

It is known that not all of the letters of an alphabetical system occur at the same frequency in a typical text. In the English alphabet, for example, letter E occurs most frequently (about 13% of the times) and letter Z appears least frequently (about 0.1% of the time). FIG. 2 depicts the frequency of occurrence of each letter of English alphabet. In the above described text entry methods, however, most frequently occurring letters often require more keystrokes than less-frequently-occurring letters. For example, according to the multi-press method, entry of letter E, the most-frequently-occurring letter, requires two activations of the key ($3_{DEF}$), whereas entry of letter J, which appears only 0.2% of the times, requires only one activation of the key ($5_{JKL}$). Using the multi-press method for entering a typical text of 1,000 letters, on the average, requires about 2,180 key activations. But if only the position of letters E and J were switched, on the average 128 fewer key activations would be needed, a saving of about 6% in the number of activations for the entire text. Likewise, to input letter S, which occurs 6% of the times, four activations of key ($7_{PQRS}$) are required, but to enter P, which occurs 2.7% of the times, only one activation of key ($7_{PQRS}$) is needed. It has been found that switching these two letters on the key would further reduce the number of activations by 5%.

Accordingly, the inefficient arrangement of the letters on the keys leads to a large number of unnecessary key activations, thereby increasing text entry time. Therefore, there exists a need for providing a keypad and a text entry method that is convenient to use, while increasing the speed by which text data is entered into a keypad.

SUMMARY OF THE INVENTION

Briefly, in accordance with the present invention, a keypad for entering letters includes an array of keys, including soft-keys, with each key being assigned to at least one letter of an alphabetical system based on the frequency of occurrence of letters in a typical body of written work. The alphabetical system comprises at least one most-frequently-occurring letter that is entered by activation of the same key and at least one less-frequently-occurring letter that is entered by activation of at least two different keys in sequence. Generally, the most-frequently-occurring letter is entered by more than one activation of the same key. In a soft-key implementation, the entry of the most-frequently-occurring letter requires touching and un-touching of the same key, i.e., tapping, as described in more detail below. For the less-frequently-occurring letters, the entry involves a sequence of touching, drag or slide, and un-touching actions.

In accordance with some of the more detailed features of the present invention, a key activation can be detected by sensing a mechanical or hard-key activation, as used in a hard-key implementation of the invention, or it can be detected electronically by sensing a touching or un-touching action on a soft-key disposed on a touch sensitive surface, as used in a soft-key implementation of the present invention. For example, soft-key activation can involve tapping as well as drag or slide actions. A tapping action requires detecting a touching action and an un-touching action on the same key; whereas, a drag or slide action requires a touching action on one key, a slide or drag action in the direction of a second key and an un-touching action.

According to one aspect of the invention, the letters are assigned to each key in accordance with position elements of a position array, which include a central position, and a plurality of peripheral positions that point to an adjacent key within the array of keys. The most-frequently-occurring letters are assigned to the central positions of the keys and less-frequently-occurring letters are assigned to the peripheral positions. A most-frequently-occurring letter is entered by a key sequence that requires the activation of a correspondingly assigned key twice. A less-frequently-occurring letter is entered by a two-key sequence that requires first activating the key assigned to the less-frequently-occurring letter and then activating the key to which the position element of the less-frequently-occurring letter points to.

According to some of the other more detailed features of the present invention, one or more non-letter symbols or characters are assigned to each key in accordance with the position elements of the position array. A non-letter symbol or character is entered by a two-key sequence that is not held for letter entry. Similar to letter entry, the two-key sequence requires first activating the key assigned to the non-letter symbol or character and then activating the key to which the position element of the non-letter symbol or character points to. If a peripheral position points to no adjacent key, a wrap-around extension points to a non-adjacent key.

BRIEF DESCRIPTION OF THE DRAWINGS

FIG. 2 shows an English letter frequency table.

DETAILED DESCRIPTION OF THE INVENTION

Figure 1:
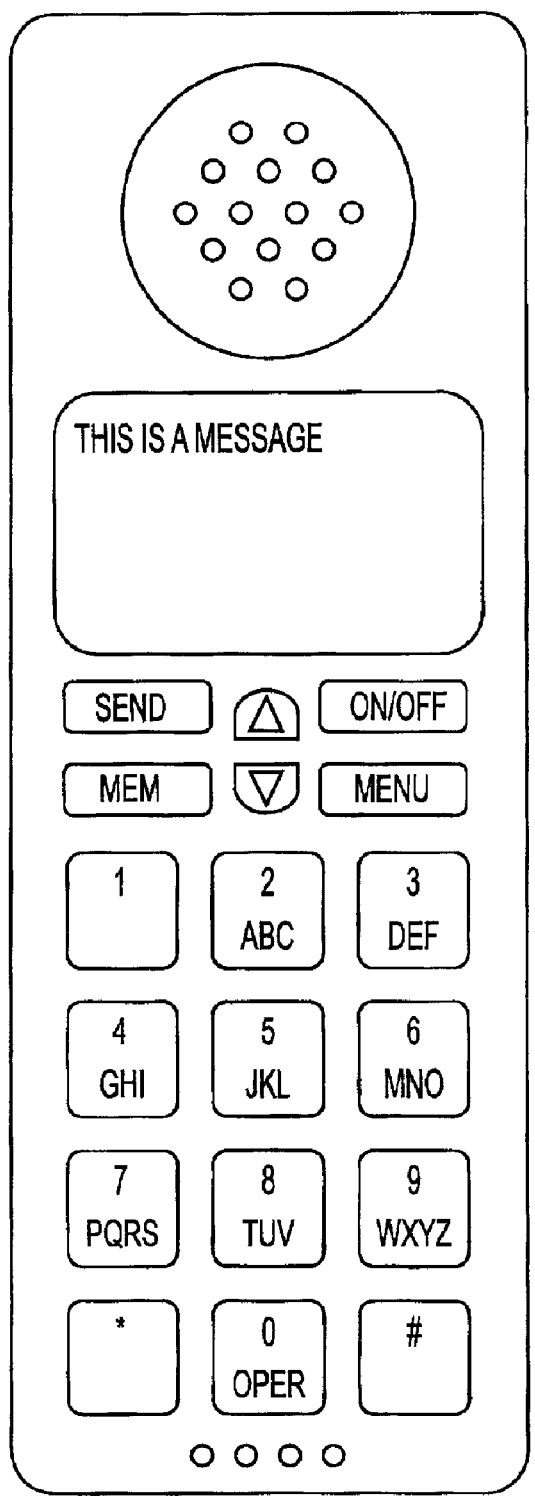
FIG. 1 shows a conventional keypad disposed on a cellular phone.
Figure 3:
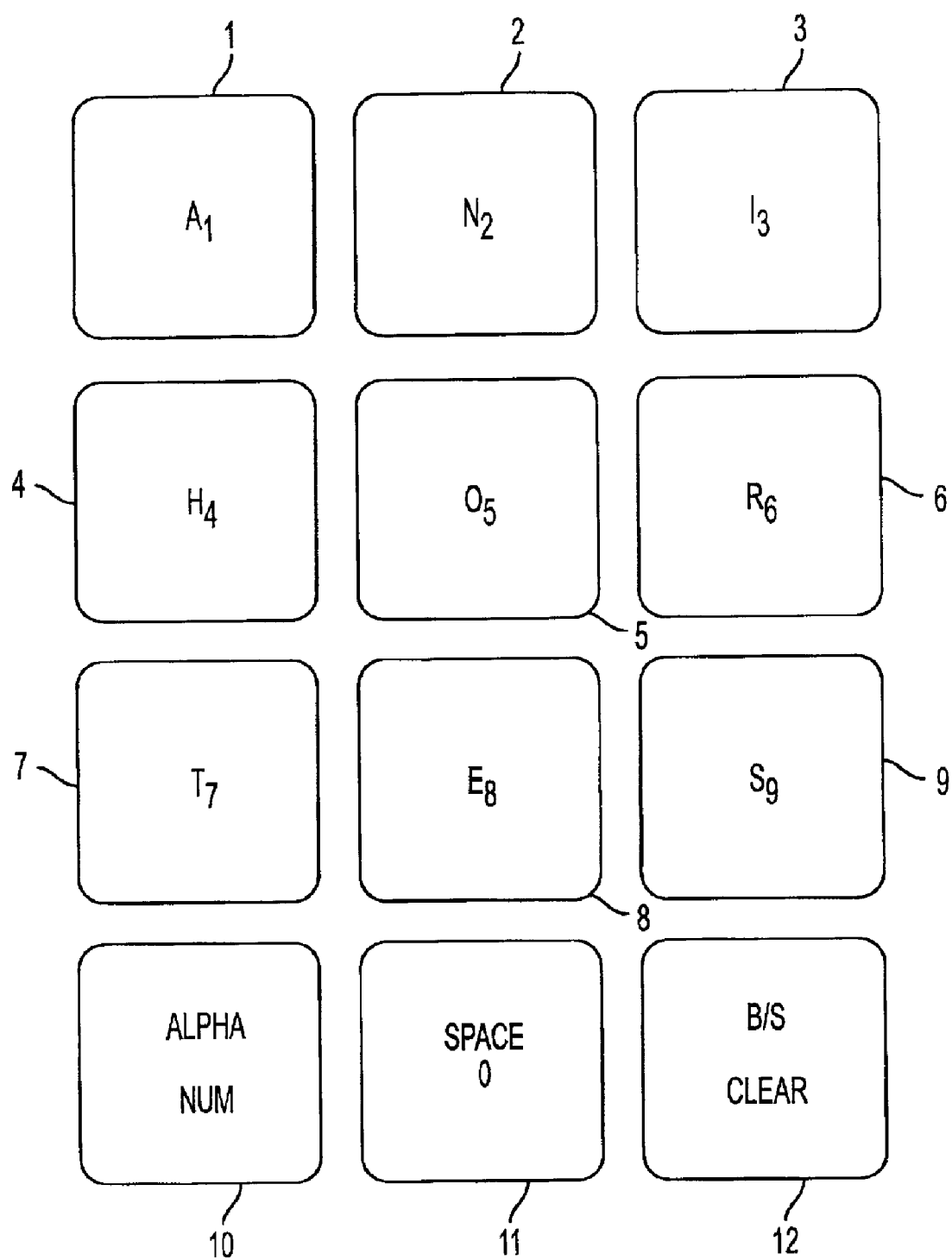
FIG. 3 shows an exemplary assignment of the most frequently used letters to the keys of a keypad in accordance with the present invention.

FIG. 3 shows a keypad having an array of keys 1–12 for entry of alphanumeric data according to the present invention. As defined herein, a key is a specified area within a user interface, such as a keypad, that is activated to generate a character signal representing a selected letter. Examples of keys include electronically or mechanically actuated switches, buttons disposed on the surface of a user interface as well as electronically generated indicia on a user interface display, such as a LCD. The array of keys comprises M rows and N columns, where M and N could be the same or different integers. The alphanumeric information corresponds to letters in an alphabetical system, where the number of letters is equal to L. In the exemplary embodiment shown in FIG. 3, the keypad uses the same pattern of numbers as used in the 12-key layout. However, the letters and non-letter symbols and characters are entered using a different layout as described below.

The array of keys 1–12 comprises 4 rows and 3 columns (i.e., M=4 and N=3). As shown in FIG. 3, a three by three array of keys 1–9 are assigned to numbers 1–9 and the center key 11 in the most bottom row is assigned to number 0. The keypad of the present invention can be operated in two modes: an alphanumeric mode and a numeric mode. The operating mode of the keypad can be set (toggled) by an ALPHA NUM key 10. In the numeric mode, a number is entered by activating a corresponding number key. In the alphanumeric mode, however, a user enters a desired letter by a sequence in accordance with the present invention that requires activating one or two keys for each letter or non-letter symbol. As used herein activating can comprise any one or combination or pressing, clicking, tapping, pointing, or otherwise, any equivalents thereof.

Letters, symbols and characters are assigned to keys 1–9. As defined herein, a letter is a first element of written language symbolized by a mark or character that is used as the representative of a sound, or of an articulation of the human organs of speech. As such, letters are written symbols or characters representing a variety of speech sounds. Each letter is a component of an alphabetical system that is represented by the letters of any language, arranged in an order fixed by custom. In short, the letters are conventional characters of the alphabet used to represent speech. A text, which can be a discourse or composition, is the body of a written work.

In one exemplary embodiment, letters are assigned to keys 1–9 in accordance with a position array having defined position elements. The position elements include a central position, and eight peripheral positions pointing to 8 adjacent keys (top, bottom, left, right, top-right, top-bottom, top-left, and top-right). Each of these peripheral positions points to an adjacent key. For example, the left position points to the left key, the top-right position points to the top-right key, etc. In the event that a position points to no key (like right position of key 3), a "wrap-around" extension points to a non-adjacent, for example, the right wrap-around extension of key 3 points to key 1. With the same extension, the top-right position of key 9 is key 4, and top-right position of key 3 points to key 7. Using this extension, every key of the keys 1–9 has eight adjacent or non-adjacent neighbors. A two-key sequence in accordance with the present invention requires first activating the key on which the desired letter is found. The position of the letter in the position array of each key dictates the location of a second key to be activated, as described further below.

Each key is assigned to at least one letter of an alphabetical system based on the frequency of occurrence of the letter in a typical body of written work. A letter frequency table for any language can be produced by counting the number of letters in a typical text and determining the percentage of occurrence of each letter in that text. FIG. 2 shows an exemplary frequency of occurrence of the 26 English letters (i.e., L=26). According to the present invention, the most-frequently-occurring letters are entered by two activation of the same key and the less-frequently-occurring letters are entered by activation of two different keys. The rational behind the key sequence of the present invention is that the most frequent letters are assigned to simple double activations of the main numerical keys. Since the first nine letters of our frequency table cover more than 70% of the letters occurring in an English text, more than 70% of the time a simple double-activation will suffice to enter the desired letter.

Based on the letter frequency table of FIG. 2, the first nine most occurring letters are assigned to the keys 1–9. The characters representing the letter are disposed at the center position of each corresponding key, as shown in FIG. 3. For example, in the alphanumeric mode, letter A can be entered by activating the key 1 twice. Likewise, letter N can be entered by activating the key 2 twice.

Figure 4:
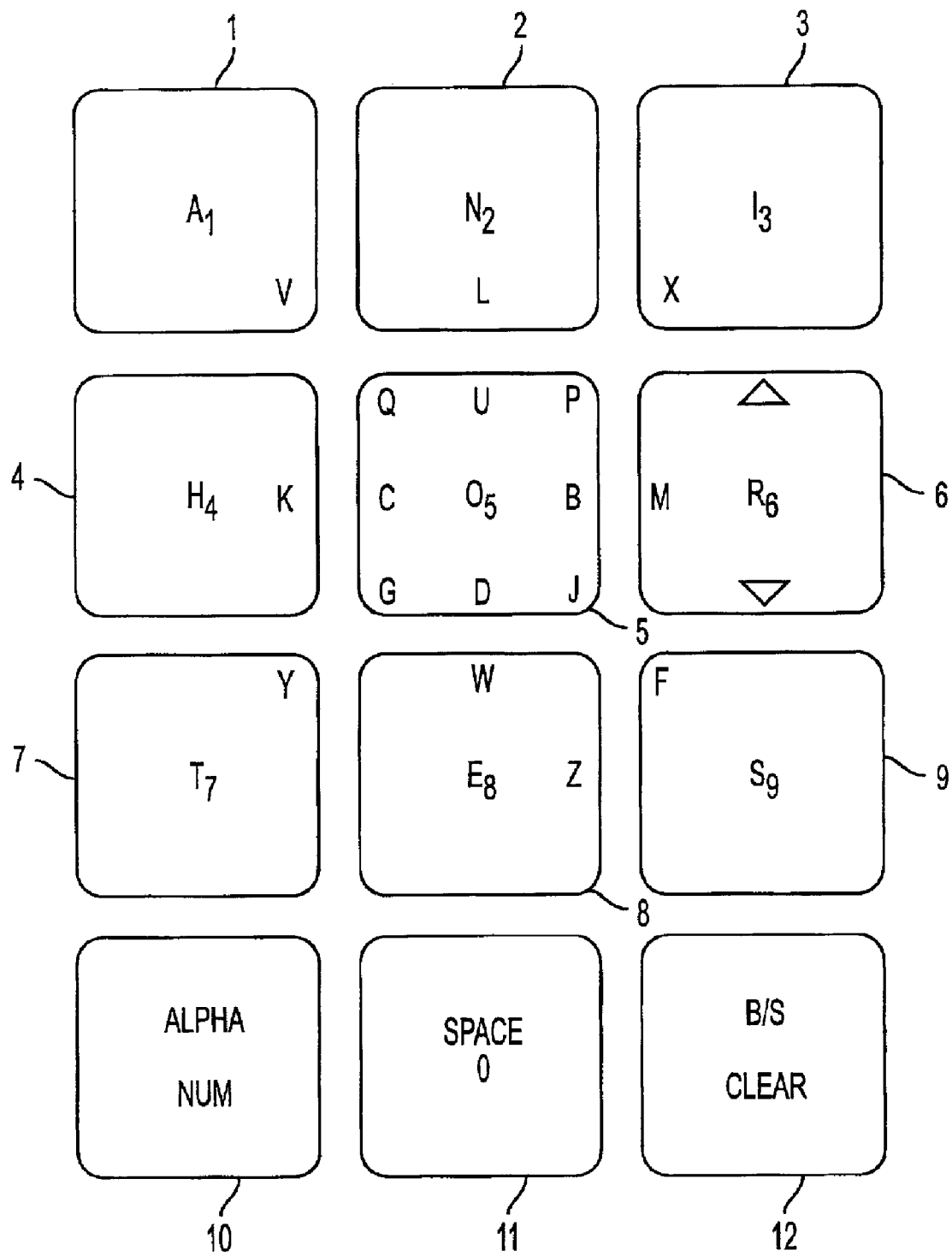
FIG. 4 shows an exemplary assignment of less frequently used letters to the keys of the keypad of FIG. 3.

While the most-frequently-occurring letters are assigned to each one of the keys within the key array, the less-frequently-occurring letters are assigned to the position elements of the keys. In other words, the less-frequently-occurring letters are assigned to peripheral positions of the position array. As shown in FIG. 4, a group of 8 less-frequently letters V, L, X, K, M, Y, W, and F are assigned to keys 1, 2, 3, 4, 6, 7, 8, 9, respectively. These keys are assigned to the position element of their respected key pointing to the central key (key 5). This first group of less-frequently-occurring letters is centered around the center key, key 5. Since key 5 is in the center, it is easy to travel to and from this key, reducing the finger traveling time. To enter any of the letters of this group, first its corresponding key and then key 5 is activated in succession. For example, to enter the letter V, keys 1 and 5 are activated in succession.

Under the preferred embodiment of the present invention, the rest of the letters (except Z) are assigned to two-key sequences either starting from key 5 and ending on one of the keys surrounding key 5. As such, this second group of least-frequently-occurring letters Q, U, P, C, B, G, D, and J are assigned to key 5 in peripheral positions pointing to keys 1, 2, 3, 4, 6, 7, 8, and 9, respectively. To enter any of these letters, first key 5 and then the key pointed to by the peripheral position of that letter are activated in succession. For example, to enter the letter Q, key 5 and key 1 are activated in succession. Finally letter Z is assigned to the right side of key 8, in the position element pointing to key 9. To enter this letter, key 8 and key 9 are activated in succession.

Figure 5:
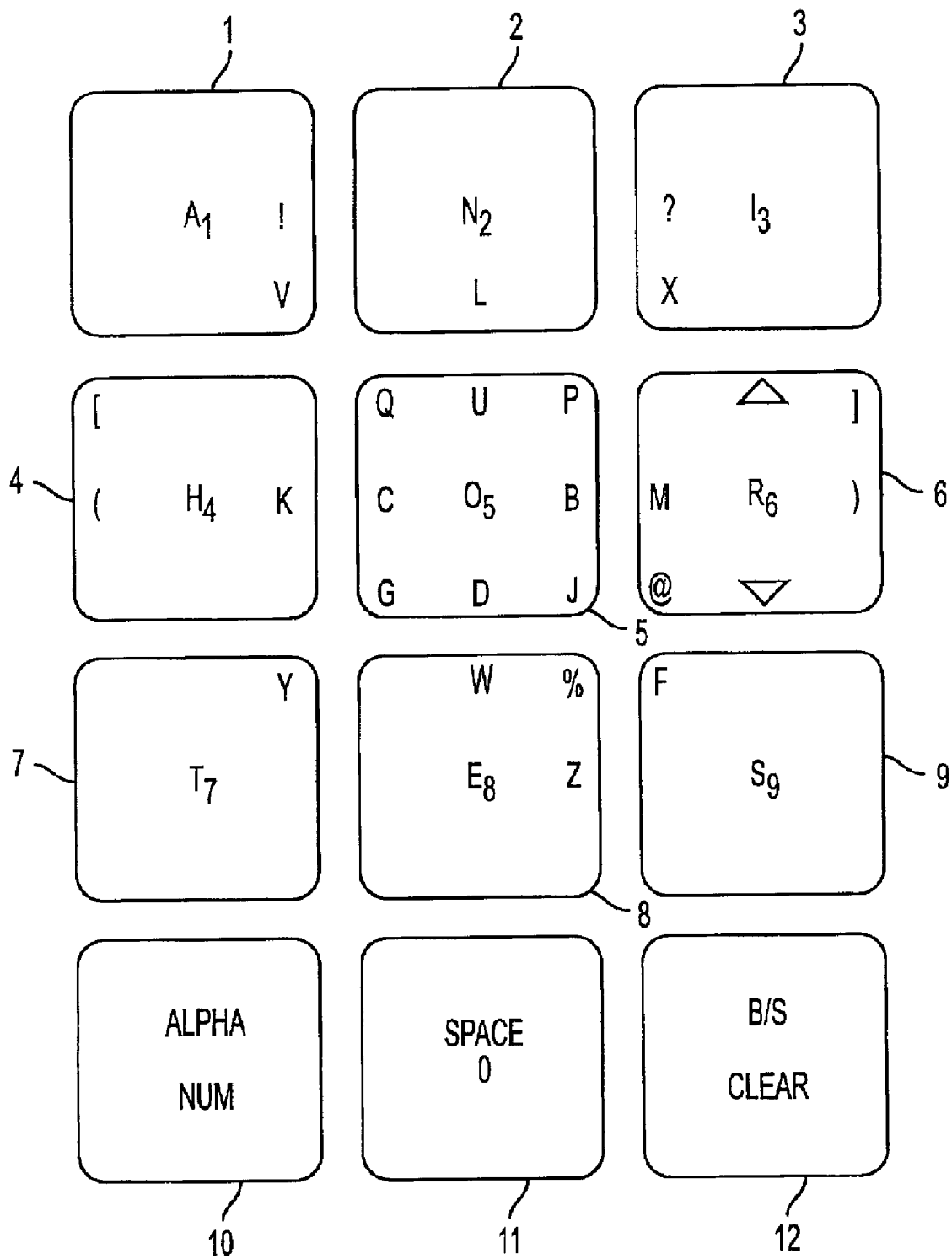
FIG. 5 shows an exemplary assignment of non-letter symbols and characters to the keys of the keypad of FIG. 4.

In the preferred embodiment, key 11, which is assigned to number 0, is also marked SPACE. In the alphanumeric mode, this key is used to enter the SPACE character using a single activation. Finally, key 12 is marked with B/S CLEAR. In the alphanumeric mode, a single activation of key 12 erases the last key entry much like a back-space function on a regular keyboard. In a keypad that is equipped with a display, repeated activation of key 12 can be used to clear the display. Two symbols (^ and v) on top and bottom of key 6 are used to implement keypad caps lock/unlock functions: key sequence activating key 6, and key 3 implements Caps-Lock, and key sequence activating key 6, and key 9 implements Caps-Unlock. This allows entering both lowercase and uppercase letters. Although FIG. 5 shows the preferred embodiment of the invention, other similar frequency tables and optimization methods can also be used to implement the present invention, which may result in similar but different letter assignment.

Although in this preferred embodiment all position elements of key 5 and one or two position elements of other keys are used up by letters, the remaining position elements of the position array of the keys can be used for entering non-letter symbols and characters. An exemplary arrangement for entering many symbols existing on a regular computer keypad is shown in FIG. 5. Given this arrangement and using the same principle of a two-key sequence, all alphanumeric letters and characters found on a regular keyboard can be entered using only one hand (one finger) and by activating a two-key sequence. For example to enter a question mark (?) key 3 and then key 2 can be activated because the non-letter symbol is disposed on the side of key 3 closest to, or "pointing" to key 2). Or to enter the closed-bracket letter (]) key 6 and then key 1 is activated because "]" is disposed on top-right side of key 6; using the wrap around extension, that points to non-adjacent key 1).

Figure 6:
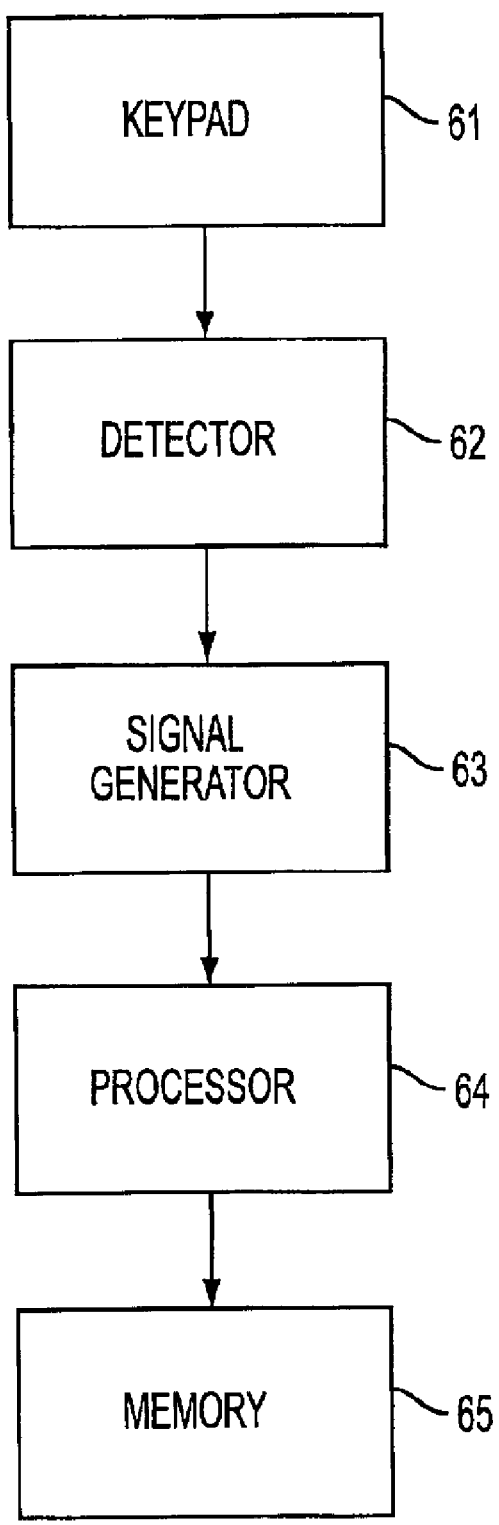
FIG. 6 shows a block diagram of a keypad system that advantageously uses the present invention.

FIG. 6 shows the block diagram of a keypad system in accordance with the present invention that may be used in an electronic device, such as a cell phone. The keypad system includes a detector 62 that detects activation of a key in a keypad 61 that are assigned to letters in an alphabetical system. A signal generator 63 generates a character signal corresponding to a selected letter or symbol. In accordance with the present invention, the signal generator 63 generates the letter signal for a most-frequently-occurring letter in response to a sequence of activation of the same key. For a less-frequently-occurring letter, the signal generator 63 generates the character signal in response to a sequence of activation of two different keys. The two-key activation sequence constitutes a unique signal sequence that is processed by a processor 64. The signal sequence can be translated into digital signals, decoded to represent an alphanumeric character and stored in a memory 65 representing alphanumeric text.

An information entry method according to the present invention includes the steps of determining the frequency of occurrences of letters in a typical body of written work that is based on an alphabetical system. The next steps require assigning letters to an array of keys based on the frequency of occurrence of the letter and activating the keys in accordance with an activation sequence that corresponds to a selected letter. Finally, the method of the invention requires generating a character signal corresponding to the selected letter in response to the activation sequence. As stated above, for a most-frequently-occurring letter, the activation sequence requires activation of the same key twice, and for less-frequently-occurring letter, the activation sequence requires activation of two different keys. As herein defined, activation sequence can include various types of key activation including, mechanical key activation, tap key activation, as drag or slide key activation as described later in more detail.

Figure 7:
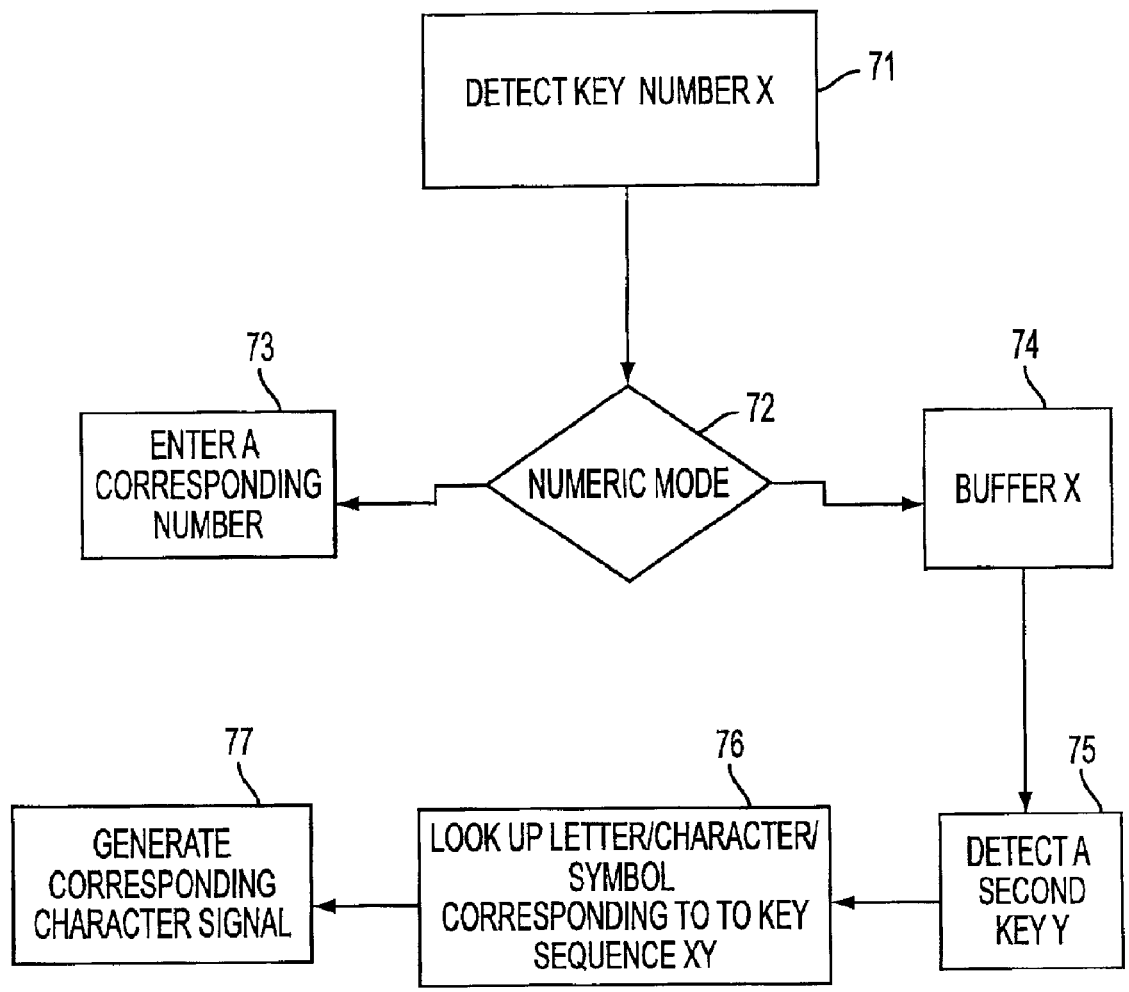
FIG. 7 shows a flow chart of a key entry method in accordance with the present invention.

The implementation of this keypad entry system requires creating a computer code that decodes any two-key sequence. The flowchart of such program is shown in FIG. 7. Once a key entry for key number X is detected, a determination is made as to the operating mode of the keypad, blocks 71 and 72. If in the numeric mode, a corresponding number is entered, block 73. Otherwise, the first number X is stored in a buffer and a second entry for a key number Y is detected, blocks 74 and 75. A lookup table can then be used to find a corresponding letter or symbol for the XY key sequence, block 76. Finally, a character signal corresponding to the decoded sequence is generated, block 77. The code for the implementation of the decoding method can be written in a variety of well-known computer languages.

Figure 8:
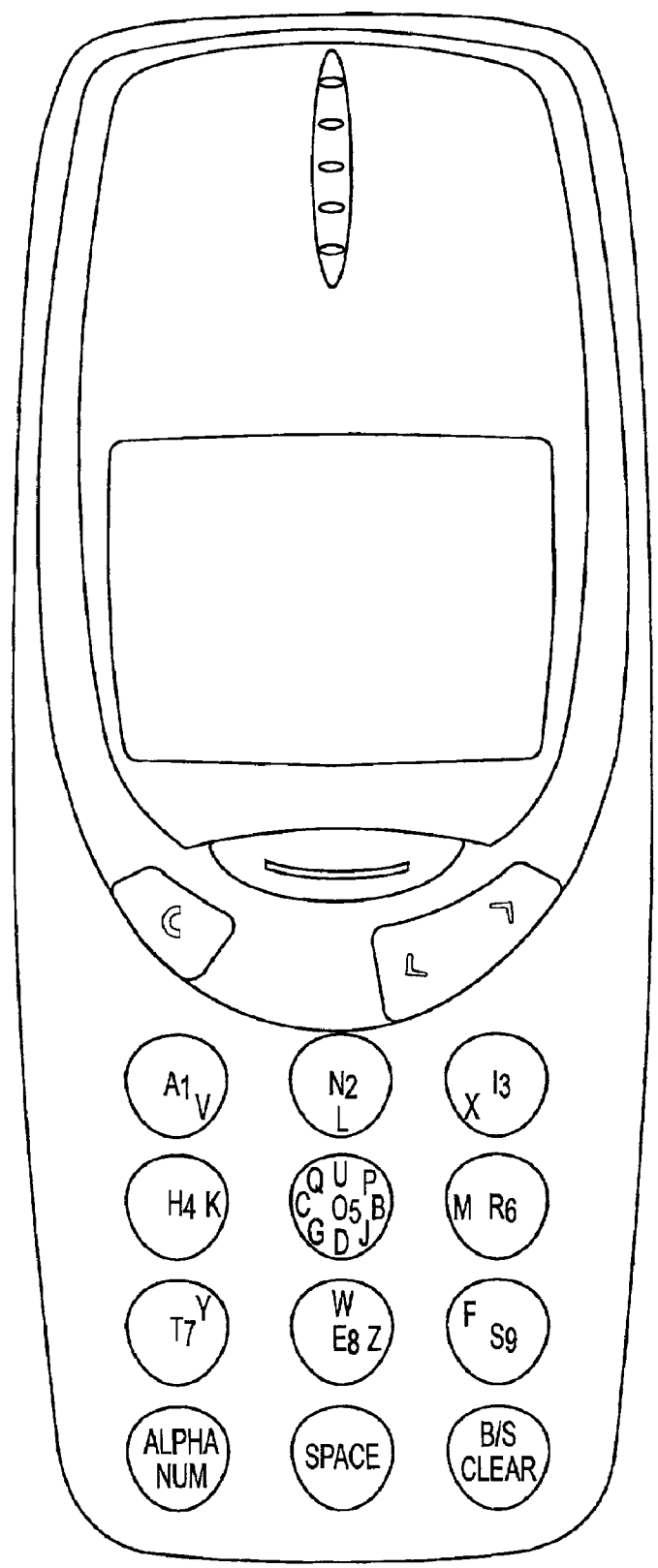
FIG. 8 shows an exemplary exchangeable keypad face for a communication device.

As part of the implementation, the keypad configuration of the invention can replace the conventional legacy keypad. An existing standard cell phone can be modified to conform to the required letter assignment of this invention. Cellular phone manufacturers often incorporate a mechanism to remove and interchange the face of the phone to allow people to change the color and texture of the face of the telephone and thereby personalize it. This facility can be used to have access to the piece of rubberized plastic that forms the keys and has the standard letter patterns inscribed on it. By providing the user with another such plastic form on which the letter pattern described in this invention is inscribed, such as the one shown in FIG. 8, the users can, at will, switch between the current standard and the proposed method of this invention without having to change or reprogram the entire telephone. Once the keypad legend is thus changed, the telephone operating program must be configured to accept input from these keys according to a corresponding preloaded program.

As part of the another implementation, the keypad configuration of the invention can replace the conventional numeric keypad found on many electronic devices, including audio-visual device remote controls, security systems, microwave ovens, automatic teller machines, cash registers, and calculators.

According to yet another embodiment, the keypad of the present invention can be implemented as soft-keys disposed on a touch-sensitive surface. In one implementation, the layout is disposed on a touch screen surface that includes defined soft-key areas used for data entry. For example, a PDA device incorporating the present invention can be programmed to display on a touch sensitive surface a 9- or 12- soft-key layout. Under this arrangement, each soft-key has a defined surface area that is designated for alphanumeric entry of corresponding characters or letters. Under one arrangement of the invention, alphanumeric characters or letters can be entered by touching and un-touching one or more corresponding soft-key areas using an implement, such as a stylus, etc., or a even a user's finger. Data entry in accordance with this embodiment of the invention is accomplished either by taping on a soft-key area, i.e., touching and un-touching the same soft-key, or touching a first soft-key area, dragging or otherwise sliding in the direction of and un-touching at or in the direction of a second soft-key area for the drag action, it's only necessary to drag, from the first key, toward the second key (i.e., it is not necessary to reach the second key to un-touch). The requirement for detecting soft-key taps, soft-key drags and other functional requirements of the invention can be programmed into the user device, which may for example be a Palm Pilot device, using well-known programming languages that can be executed by a microprocessor that controls the operation of the device.

According to this aspect of the present invention, the more-frequently-occurring letter, such as those identified above, are entered by a single tap on a corresponding soft-key area. For less-frequently-occurring letters, data entry is accomplished by a drag or slide action that starts from a selected first soft-key in the direction of a second soft-key. A user holding a stylus can perform the tap as well as the drag or slide action. A tap is the action of making contact (e.g., touching) at an initial point or a soft-key area and removing the contact (e.g., un-touching) at substantially the same initial point or soft-key area. Thus, the tapping action requires a touching action and an un-touching action of the same soft-key area. For data entry with a stylus, for example, a tap is registered by touching the soft-key area with the stylus and then lifting the stylus from the same soft-key area. A drag or slide action requires making contact with a soft-key area, i.e., the first soft-key area, moving the stylus in the direction of another soft-key area and lifting the stylus. The lifting of the stylus can happen at the direction of or at the perimeter other soft-key, i.e., the second soft-key area. For example, touching the stylus anywhere on the top-middle square on of the soft-keypad and dragging it down (for about ¼ to ½ of the key width) enters the letter L. Likewise dragging from anywhere on that square toward the right side enters the plus symbol '+'.

Therefore, key activation includes activation resulted from tapping as well as drag or slide activation of soft-keys In this way, a character or symbol that requires more than one activation of the same key in the hard-key implementation of the present invention is entered by a single tap in the soft-key implementation. On the other hand, a character or symbol that requires activation of the different hard-keys is entered by a drag or slide action in the soft-key implementation. The soft-key implementation of the present invention enables the full text entry of 52 lowercase and uppercase letters, numbers and up to 53 symbols or special characters each by either a single tap action for the most frequently used letters, or a drag and slide action for the less frequently used characters. With the same total area, the area of each key of the soft-key implementation of the present invention can be bigger than the area of a key of conventional other soft-keyboards. Relatively bigger keys can be expected to ease targeting and reduce error rate. Also, the bigger keys may allow the users to enter text with one's finger, rather than the stylus.

From the foregoing description, it would be appreciated that the present invention by judicial arrangement of letters in accordance with the letter frequency occurring naturally in text, simplifies text entry and increases entry speed, thereby providing a more efficient way to enter letters into a keypad. Unlike the multi-press system in wide use today, the two-key sequence of the present invention does not require pausing between the key sequences. Therefore, the speed of text entry mainly depends on the familiarity of the user with the keypad layout. Furthermore, the maximum entry speed of this keypad arrangement, measured by the method presented in the aforementioned study (Silfverberg, M., MacKenzie, I. S., & Korhonen, P, *Predicting text entry speeds on mobile phones*, Proceedings of the ACM Conference on Human Factors in Computing Systems—*CHI* 2000, pp. 9–16. New York: ACM 2000) has been found to be about 30 WPM for the non-soft-key implementation and 47 WPM for the soft-key implementation of the present invention, superior to the multi-press or two key methods in use today. Another advantage of the keypad of the invention is that it can be used one-handed, and since it requires few keys, it can be used for touch typing, a task which is not easy to achieve with miniaturized QWERTY keys.

What is claimed:

1. A keypad for entering letters, comprising:
   an array of keys with each key being assigned to at least one letter of an alphabetical system based on the frequency occurrence of the at least one letter in a typical body of written work, wherein the alphabetical system comprises at least one most-frequently-occurring letter that is entered by more than one key activation associated with the same key and at least one less-frequently-occurring letter that is entered by at least one key activation with each of at least two different keys.

2. The key-pad of claim 1, wherein each key is a soft-keys-presented to a user on a display device in accordance with a program executed on a device processor.

3. The keypad of claim 1, wherein the more than one key activation at the same key requires at least one touching and at least one un-touching of a touch-sensitive surface at substantially the same location, and wherein the at least one key activation at each of at least two different keys requires touching the touch-sensitive surface at a first location and un-touching the touch sensitive surface at a second location that is different from the first location.

4. The keypad of claim 1, wherein one or more letters are assigned to each key in accordance with a position array having defined position elements.

5. The keypad of claim 4, wherein the position elements include a central position and at least one peripheral position that point to an adjacent key.

6. The keypad of claim 5, wherein a most-frequently-occurring letter is assigned to the central position and a less-frequently-occurring letter is assigned to the peripheral position.

7. The keypad of claim 6, wherein a less-frequently-occurring letter is assigned to the central position and a less-frequently-occurring letter is assigned to the peripheral position.

8. The keypad of claim 7, wherein one or more non-letter symbols or characters are assigned to each key in accordance with position elements of the position array, wherein a non-letter symbol or character is entered by a two-key sequence that requires first activating the key assigned to a non-letter symbol or character and then activating the key to which the position element of the non-letter symbol or character points to.

9. The keypad of claim 1, wherein a wrap-around extension points to a non-adjacent key, if a peripheral position points to no adjacent key.

10. The keypad of claim 1, wherein a key activation includes touching a substantially the same or different locations of a surface or un-touching of substantially the same or different locations of the surface.

11. A keypad system comprising:
   (a) an array of keys with each key being assigned to at least one letter in an alphabetical system based on the frequency of occurrence of the least one letter in a typical body of written work;
   (b) a detector that detects activation at a key; and
   (c) a signal generator that generates a character signal corresponding to a selected letter in accordance with a key sequence, wherein for a most-frequently-occurring letter, the key sequence requires two key activations at the same key, and for a less-frequently-occurring letter the key sequence requires key activation at two different keys.

12. The keypad system of claim 11, wherein most-frequently-occurring letters are assigned, at most, to each one of all the keys within the key array, and less-frequently-occurring letters are assigned in accordance with at least one element of a position array.

13. The keypad of claim 12, wherein at least one least-frequently-occurring letter is assigned in accordance with at least one element of a position array.

14. The keypad system of claim 13, wherein the array of keys comprises M rows and N columns and the number of letters in the alphabetical system is equal to L.

15. The keypad system of claim 14, wherein M=N=3 and L=26.

16. The keypad system of claim 14, wherein M=4 and N=3, and wherein one of the keys that is not assigned to a letter is used for selecting an alphanumeric operating mode of the keypad system.

17. The keypad of claim 11, wherein each key is a soft-keys presented to a user on a display device in accordance with a program executed on a device processor.

18. The keypad system of claim 11, wherein a key activation includes touching of substantially the same or different locations of a surface or un-touching of substantially the same or different locations of the surface.

19. An information entry method for a keypad, comprising:
   (a) determining the frequency of occurrences of letters in a typical body of written work that is based on an alphabetical system;
   (b) assigning letters to an array of keys based on the frequency of occurrence of the letters;
   (c) activating at least one of the keys in accordance with a key sequence that correspond to a selected letter, wherein for a most-frequently-occurring letter, the key sequence requires multiple activation of the same key, and for a less-frequently-occurring letter, the key sequence requires activation of two different keys; and
   (d) generating a character signal corresponding to the selected letter in response to the key sequence.

20. The method of claim 19, wherein a key activation includes touching of substantially the same or different locations of a surface or un-touching of substantially the same or different locations of the surface.

21. The method of claim 19, wherein each key is a soft-keys presented to a user on a display device in accordance with a program executed on a device processor.

* * * * *